Feb. 6, 1962 W. M. HALL 3,019,604
TURBOJET THRUST COMPUTER
Filed Jan. 19, 1959
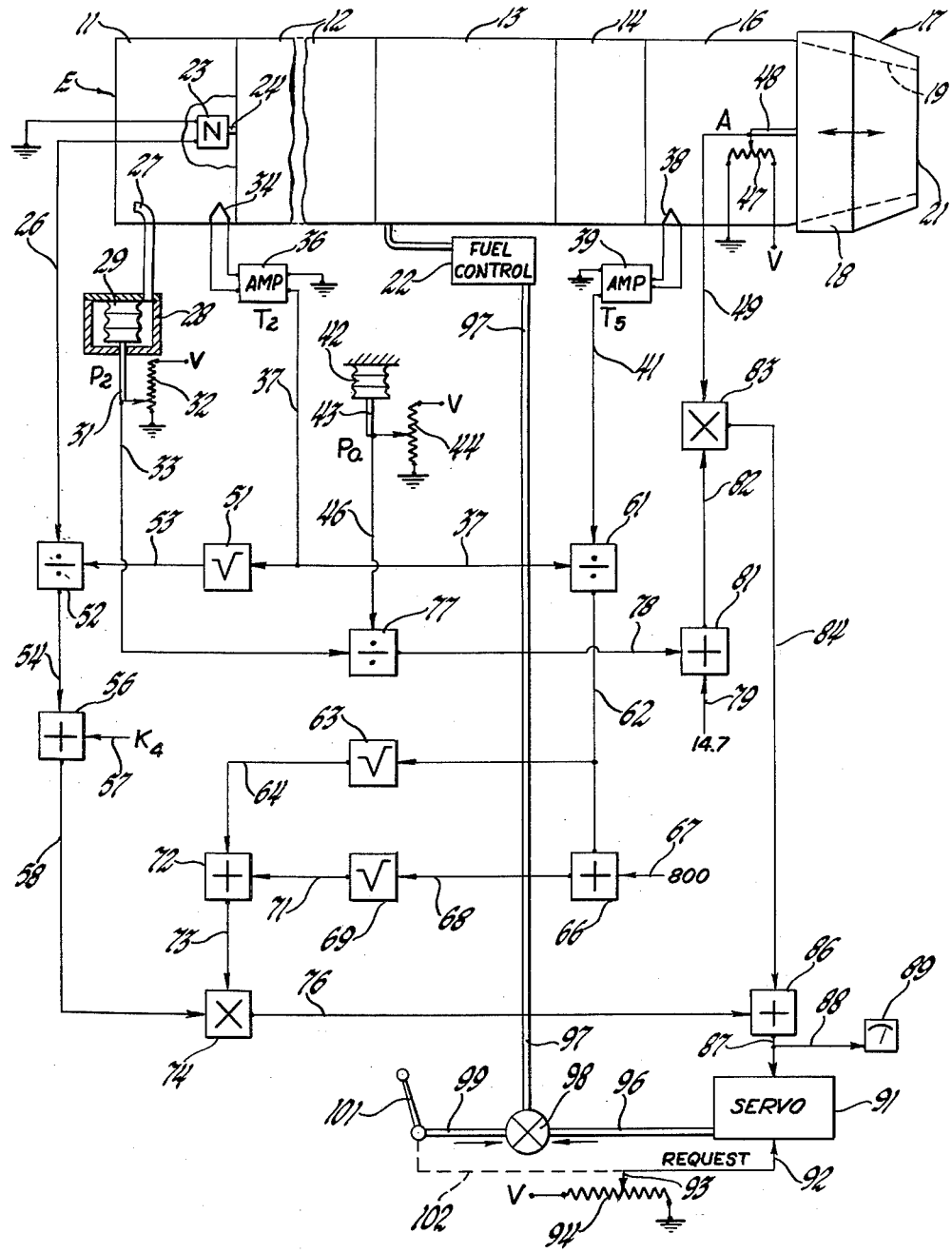
INVENTOR.
William M. Hall
BY
Paul Fitzpatrick
ATTORNEY

United States Patent Office 3,019,604
Patented Feb. 6, 1962

3,019,604
TURBOJET THRUST COMPUTER
William M. Hall, Milwaukee, Wis., assignor to General Motors Corporation, Detroit, Mich., a corporation of Delaware
Filed Jan. 19, 1959, Ser. No. 787,517
5 Claims. (Cl. 60—39.28)

My invention relates to thrust computing and control means for gas turbine jet engines.

There has long been a need for instrumentation to determine the thrust of a turbojet engine which would be suitable for use with installations of such engines in aircraft. It is, of course, a relatively simple matter to determine the thrust of an engine on a test stand by direct measurement of the force reaction of the engine against its mount. It is possible to use similar means in aircraft, but not practical.

It has long been considered that the indirect determination of the thrust of an engine, by which is meant determination of the thrust by computation from other conditions without direct measurement of the thrust, could not be achieved in any practical way except on a test stand. This belief derived from the fact that no way of computing the thrust of the engine without measurements of gas velocities and temperatures at a number of points in the exhaust jet was known. While it is possible to provide a network of probes in the outlet of an engine on a test stand, this is entirely impractical when the engine is in use for aircraft propulsion.

My invention is based upon my discovery that the value of thrust of a turbojet engine may be computed to a satisfactory degree of accuracy from the values of certain conditions which are readily susceptible of measurement and certain parameters related to the specific engine construction. On the basis of this discovery, it is possible to measure selected conditions, convert the measurements into quantities such as voltage, pressure, or physical movement suitable for use as inputs to a computing mechanism, and feed these inputs to a suitable computing mechanism which provides an output representative of the thrust of the engine under the obtaining conditions.

Preferably, the thrust is expressed in terms of corrected thrust, that is, thrust corrected for the inlet pressure of air entering the engine. The output of the computing device may provide an indication of corrected or actual thrust of an engine. When several engines are installed in an aircraft, indications of the thrust of each engine may thus be provided. Such indications will make it possible for the pilot to balance the thrusts of the engine or to set the thrusts at a value commensurate with best economy or other desired results.

The thrust measurement output of the computing mechanism may be employed in an automatic thrust control of the associated engines to provide a desired thrust level or to equalize the thrust of a number of engines.

The nature of the invention, the preferred mode of putting it into practice, and the advantages thereof will be clearly apparent to those skilled in the art from the succeeding description of the preferred embodiment of the invention and the accompanying drawing.

The FIGURE is a schematic drawing of a turbojet engine and control apparatus therefor embodying the invention. Before proceeding to a detailed description of the schematic, it may be pointed out that the indicating or control device according to the invention bases the computation of thrust upon parameters representative of the characteristics of the particular type of engine and upon measurements of the actual values of six engine operating quantities from which the thrust may be computed.

All of the quantities are such that they may readily be measured by instruments of well-known types. These variable quantities upon which the computation is based are the rotational speed of the engine $N$, the total pressure $P_2$ in the engine inlet, the total temperature $T_2$ in the engine inlet, the total temperature $T_5$ in the turbine outlet, the ambient atmospheric pressure $P_A$, and the area $A$ of the jet nozzle of the engine.

Referring now to the drawings, there is illustrated conventionally a turbojet engine E which may be of any ordinary type, and which is illustrated as comprising the usual air inlet section 11, compressor 12, combustion section 13, turbine 14, exhaust duct 16, and variable area jet nozzle 17, these being connected together in series for flow therethrough. The turbine 14 drives the compressor 12, which takes air from the inlet 11 and delivers it to the combustion chamber 13 in which fuel is burned. The resulting combustion products are expanded partially in the turbine 14, and the exhaust gases flow through the duct 16 and are discharged at high velocity through the nozzle 17. The nozzle illustrated is of a known type in which an axially movable shroud 18 is connected to a ring of flaps or plates 19 which are moved inwardly and outwardly by the shroud to vary the area of the discharge opening or nozzle at 21. Fuel is supplied to the engine from a suitable source such as an engine driven pump, not shown, through a fuel control 22, which may be of any suitable known type. Suitable means, not illustrated, may be provided to control the nozzle area by moving the shroud 18.

Proceeding now to the means for measuring the quantities referred to above, since the preferred computing mechanism is of an electrical type, the measuring means are chosen from those which provide an electrical output or incorporate suitable means for converting the measurement into an electrical potential. The rotational speed of the engine, that is, the speed of the compressor and turbine, may be measured, for example, by a tachometer generator 23 driven by shaft 24 connected to the compressor. The output of the generator is a potential directly proportional to speed, which is transmitted to the computing mechanism through line 26.

Pressure in the engine inlet is measured by a total pressure or ram probe 27 mounted in the inlet and connected to a housing 28 enclosing an evacuated bellows 29, one end of which is fixed. Expansion and contraction of the bellows is a function of total pressure. The free end of the bellows is connected by a stem 31 extending from the housing 28 to the movable contact of a potentiometer 32 supplied with a fixed reference voltage indicated by the symbol V. As will be apparent, the output potential supplied by the movable contact to the line 33 represents ram pressure. By a suitable contouring of the potentiometer winding the potential on line 33 is made directly proportional to total pressure in the engine inlet.

Engine inlet temperature may be measured by one or a number of thermocouples, represented by the thermocouple 34, mounted in the inlet and connected to an amplifier 36. The output of the amplifier, which is the potential on the output line 37, is directly proportional to temperature.

Temperature $T_5$ in the turbine outlet is measured as is customary by thermocouples 38 represented on the figure by a single thermocouple connected to the usual amplifier 39. The potential output of this amplifier on line 41 is directly proportional to turbine outlet total temperature which equals the temperature of the gas passing through the jet nozzle.

The means responsive to ambient pressure comprises an evacuated bellows 42, one end of which is fixed, and the free end of which is connected by a stem 43 to the movable contact of a potentiometer 44. The bellows is exposed to ambient atmospheric pressure, with the result that the displacement of the movable contact depends upon ambient pressure. Potentiometer 44 is supplied with a fixed reference voltage from a source indicated by V and the potentiometer is so contoured that the potential applied to line 46 by the movable contact is directly proportional to ambient pressure.

The area of the jet nozzle is measured by the movable contact of a potentiometer 47 which is fixed by bracket 48 to the shroud 18 so as to move with it. Potentiometer 47 is supplied with reference voltage from a source represented by V and the windings of the potentiometer are so contoured that the potential picked off by the movable contact and supplied to line 49 is directly proportional to nozzle area.

As will be seen, all of these means for providing potentials representative of the determining quantities are of simple and well-known types. Any suitable means for the purpose may be employed, the ones described being merely illustrative of operative mechanisms for the purpose. The reference voltages, which may be the same or may all be different, may be derived from any suitable controlled source of direct current.

Before proceeding to the description of the particular computing mechanism illustrated, it may be pointed out that the formula by which thrust is computed may be expressed in the form $$\frac{F}{\delta_2} = \left[ k_3 \frac{N}{\sqrt{\theta_2}} - k_4 \right] \left[ k_1 \sqrt{\frac{T_5}{\theta_2} - 800} - k_2 \sqrt{\frac{T_5}{\theta_2}} \right] + A \left[ 14.7 - \frac{P_A}{\delta_2} \right]$$

In this formula, N, $P_2$, $T_2$, $T_5$, and $P_A$, and A are the quantities previously referred to and defined. F is thrust. Symbol $\delta_2$ represents the ratio of total pressure in the inlet to standard atmospheric pressure, which is approximately 14.7 lbs. per square inch. This, of course, merely amounts to a representation of $P_2$ on a different scale. Symbol $\theta_2$ represents the ratio of total temperature in the inlet to standard temperature or, in other words, $T_2/519$. The constants $k_1$, $k_2$, $k_3$, and $k_4$ are constants which fit the equation to the characteristics of a particular engine, and which may be determined from the results of test stand operation of the engine.

As will be seen from the formula and from the nature of the responsive devices already described, the result is obtained from measurements which may readily be made on an engine in flight, all of which are in fact made in connection with the usual controls of such engines. There is no necessity for probes in the jet nozzle or other impractical means for setting up the values from which the thrust is calculated.

It will also be noted that the finally calculated quantity is the ratio of thrust to $\delta_2$ rather than the absolute value of thrust. The reason for this is that it is preferred to provide an indication or a control based upon thrust corrected for total inlet pressure rather than the absolute magnitude of thrust. If the absolute magnitude of thrust is desired, this may be obtained from the result of the equation by mere multiplication by $\delta_2$. In this specification, the term "thrust" is used for conciseness to mean either actual or corrected thrust.

Various calculating instruments may be used for continuous solution of the thrust equation set out above as the input quantities vary. Because of the light weight, compactness, accuracy, and quickness of response of electrical computing means, such as electronic analog computer mechanisms, such mechanisms are preferred. The figure illustrates schematically the connection of various electrical computing units to solve the thrust equation. Proceeding with the description of the organization of the computer, corrected speed of the engine $N/\sqrt{\theta_2}$ is derived by a square root extractor 51 receiving an input of $T_2$ from line 37 and a dividing unit 52 receiving an input of N through line 26 and an input of $\sqrt{\theta_2}$ from unit 51 through line 53. Units 51 and 52, as all of the other computer units referred to subsequently, will include means for providing a suitable scale relation between the input or inputs and the output. As previously pointed out, $\theta$ is T multiplied by the constant 1/519. The dividing unit 52 divides N by $\sqrt{\theta_2}$ to provide a potential representative of corrected speed in output line 54. The scale of the output is such that the potential in line 54 represents the arbitrary constant $k_3$ times corrected speed. The value of the arbitrary constant $k_4$ is subtracted from the value in line 54 by a summing unit 56 to which both are supplied. The value of $k_4$ in line 57 is represented by a potential taken from a suitable stabilized direct current power source. The potential output of the summing device 56 to line 58 equals to a suitable scale the term $k_3 N/\sqrt{\theta_2} - k_4$.

At this point it may be best to return to the input portion of the computer and take up the computation of the temperature ratio expressed as $T_5/\theta_2$ which represents the total temperature of the motive fluid entering the exhaust duct from the turbine outlet. Line 37 is connected to a dividing unit 61 where it provides the divisor $T_2$. The value of $T_5$ is supplied to this dividing unit through line 41 and the potential output through line 62 is scaled to represent $T_5/\theta_2$. This term appears twice in the thrust equation. The square root of the quantity is derived by square root unit 63 and transmitted through line 64. Unit 63 also multiplies by the constant $k_2$ so that line 64 carries $k_2\sqrt{T_5/\theta_2}$. The quantity $T_5/\theta_2 - 800$ is derived by the summing unit 66 which receives an input from line 62 and a fixed potential representing the number minus 800 through line 67. The output is supplied through line 68 to the square root unit 69 which provides an output of $k_1\sqrt{T_5/\theta_2 - 800}$ through line 71.

The term within the second bracket of the thrust equation is derived by addition in the summing unit 72 of the two values from line 64 and line 71, taken with opposite signs, and is transmitted through line 73. The quantities in lines 58 and 73 are multiplied in the multiplying unit 74 to provide the product in line 76. This represents the products of the two terms in brackets in the thrust equation.

The remainder of the thrust equation is derived from nozzle exit area, ambient pressure, and inlet total pressure. Ambient pressure transmitted through line 46 is divided by inlet total pressure transmitted through line 33 in the dividing unit 77, which provides an output through line 78 scaled to equal $P_A/\delta_2$. This quantity is subtracted from the fixed value 14.7 representing normal atmospheric pressure which is supplied from a controlled potential source through line 79 by the summing unit 81. This sum is transmitted through line 82 to the multiplying unit 83 which also receives nozzle area A through line 49. The product is delivered as a potential in line 84. This potential is added to that in line 76 in the summing mechanism 86, which provides an output in line 87 representing the right hand term of the thrust equation. As illustrated in the figure, the output may be connected through line 88 to an electrical indicator 89 calibrated in terms of corrected thrust.

The thrust signal may also be used in any suitable manner to control the engine to cause it to operate at the desired thrust level. Means are shown in the figure by which this is accomplished by trimming the power or fuel control of the engine. Since thrust may also be varied by nozzle area, the control may also act upon nozzle area or upon both fuel supply and area. As is well known, turbojet engine fuel controls in some cases involve correlated controls of fuel supply and nozzle area.

Proceeding with the control illustrated, the thrust signal in line 87 may be supplied to a power servo 91. The servo receives an electrical signal input through line 92 representing the thrust requested. This signal may be established in any suitable way as, for example, by manual adjustment of the slider 93 of a potentiometer 94 energized by a source of reference voltage. The servo 91 is of a standard type in which the output, which is expressed by rotation of a shaft 96, is moved to cause the input to equal the request. This may be accomplished by adjustment of the fuel supply to the engine to bring the thrust into agreement with the request. One manner in which this may be accomplished is to use the rotation of shaft 96 as a trimming control on the setting of the engine fuel control. As illustrated, the fuel control has an input shaft 97, the position of which determines the fuel supply and therefore the thrust level of the engine. Shaft 97 is driven by the output of a mechanical or other differential 98, the inputs of which are driven by shaft 96 and by shaft 99 rotated by manual power controller 101 operated by the pilot or engineer. Slider 93 may be coupled to the controller 101 by any suitable connection 102 to be set thereby, or may be independently adjustable.

The servo 91 should include some means for bringing the output to a neutral or null position to eliminate the trimming or overriding effect of the servo on the fuel supply when exclusive manual engine control is desired.

As will be apparent, if each of a group of engines has a thrust computer and servo, a common thrust request signal may be put into all the servos to cause all the engines to be trimmed to the same value of thrust within the operating tolerance of the thrust control.

Returning to the computing mechanism, it may be pointed out that the computing units or, more specifically, the adding, dividing, multiplying, and square root extracting units are shown in the figure by block symbols because the details of structure of these elements of the system are immaterial to the invention and such computing elements are known. Therefore, there is no need to burden this specification with description of the details of any particular suitable mechanism of this sort. Such computing elements are well known and widely used and have been described extensively in the literature. In this connection, reference may be made to "Electronic Analog Computers" by Korn and Korn (2d ed.) McGraw-Hill, New York, 1956, and "Analog Methods in Computation and Simulation" by Soroka, McGraw-Hill, 1954. These books contain general descriptions of such units and references to the technical literature. It will be appreciated that changes of scale or of sign as needed to correlate the various computing elements or units may be accomplished by mechanisms within the units or by suitable auxiliary units such as constant multipliers to change scale or functional amplifiers to reverse sign. In some cases, the summing devices indicated may be included as parts of multipliers or other units.

It may be desirable to append to the foregoing disclosure of the preferred embodiment of the invention a brief statement of the basis for the thrust equation employed. This equation is semi-empirical.

The theoretical thrust equation for a reaction engine may be stated as $$F = \dot{W}\sqrt{H_5}\sqrt{\frac{2J}{g}}\sqrt{1-\frac{h_8}{H_8}} + A_8(p_8 - p_{amb}) \quad (1)$$

The first term represents momentum rate of the gas flow, the second the effect of static pressure difference at the nozzle exit plane. As to symbology, subscripts 5 and 8 refer to the turbine outlet and the nozzle exit plane, respectively. $\dot{W}$ is weight rate of air flow, H is total enthalpy, J the mechanical equivalent of heat, g the gravitational constant, h is static enthalpy, A is area, and p is static pressure.

It is desired to restate the thrust in such a way as to eliminate nozzle exit plane quantities difficult to measure. This has been made possible by use of test cell data to find additional empirical relations among the engine variables.

Equation 1 was restated in terms of corrected physical quantities and the enthalpies were converted to temperatures by inserting a multiplying constant valid over the temperature range involved. It was assumed that total temperature $T_5$ equals $T_8$. Since test cell data extrapolated to zero thrust although gas flow did not, an empirical constant ($k_2$) was inserted. The result of these transformations is $$\frac{F}{\delta_2} = \dot{W}\frac{\sqrt{\theta_2}}{\delta_2}\sqrt{\frac{T_5}{\theta_2}}\left[k_1\sqrt{1-\frac{t_8/\theta_2}{T_5/\theta_2}} - k_2\right] + A_8\left[\frac{p_8}{\delta_2} - \frac{p_{amb}}{\delta_2}\right] \quad (2)$$

The turbine engine displays linear characteristics as an air pump, test cell data showing that $$\dot{W}\frac{\sqrt{\theta_2}}{\delta_2} = k_3\frac{N}{\sqrt{\theta_2}} - k_4 \quad (3)$$

Also, the corrected static temperature of the exit plane gas, $t_8$, was taken to be a constant such that $$\frac{t_8}{\theta_2} = 800° R. \quad (4)$$

This figure represents the completely expanded nozzle gas and was found to provide a good empirical simplification.

Substituting (3) and (4) in (2) and putting $$\sqrt{T_5/\theta_2}$$

within the second brackets, we arrive at $$\frac{F}{\delta_2} = \left[k_3\frac{N}{\sqrt{\theta_2}} - k_4\right]\left[k_1\sqrt{\frac{T_5}{\theta_2} - 800} - k_2\sqrt{\frac{T_5}{\theta_2}}\right] + A_8\left[\frac{p_8}{\delta_2} - \frac{p_{amb}}{\delta_2}\right] \quad (5)$$

It will be seen that the first term on the right hand side of (5) is in the final form.

Proceeding to the simplification of the second term, it was found from experimental data that $p_8/P_8$ remained roughly constant for all flight conditions. P symbolizes total pressure.

Since weight flow through the nozzle is expressed by $$\frac{W_8\sqrt{T_8}}{A_8P_8} = f(p_8/P_8) \quad (6)$$

where $f$ represents a function, if $p_8/P_8$ is constant, therefore $$W_8\sqrt{T_8} = k'A_8P_8 \quad (7)$$

and $$A_8p_8 = kW_8\sqrt{T_8} = kW_8\sqrt{T_5}$$

since $T_8$ substantially equals $T_5$. Therefore, the term $A_8p_8/\delta_2$ of Equation 5 is proportional to $W_8\sqrt{T_5}$ under sea level static conditions. Under these conditions, $p_{amb}/\delta_2 = 14.7$.

It has been found that no serious error results from determining the constants $k_1$, $k_2$, $k_3$, and $k_4$ by ignoring the term $$A_8\left[\frac{p_8}{\delta_2} - \frac{p_{amb}}{\delta_2}\right]$$

of Equation 5 when corrected quantities from engine test cell data are used. In effect, this absorbs this term into the first term for standard sea level static conditions, without error in view of Equation 7.

The term in question may, therefore, be restated on this empirical basis as $$A_8\left[14.7 - \frac{p_{amb}}{\delta_2}\right]$$

the term within the bracket being zero at sea level static and compensating for altitude and flight speed effects. The final equation then becomes, substituting the symbols employed in the description of the computer, the thrust equation set out in the description of the computer, $$\frac{F}{\delta_2} = \left[ k_3 \frac{N}{\sqrt{\theta_2}} - k_4 \right] \left[ k_1 \sqrt{\frac{T_5}{\theta_2}} - 800 - k_2 \sqrt{\frac{T_5}{\theta_2}} \right] + A \left[ 14.7 - \frac{P_A}{\delta_2} \right]$$

As will be seen, this equation results both from theory and from the discovery of empirical relationships which greatly simplify the equation, and, therefore, the thrust computer.

It will be apparent that variations in the expression of the thrust equation developed herein and therefore of the computer organization may be made within the scope of the invention.

I claim:

1. A thrust computer for a turbojet engine comprising, in combination, means responsive to rotational speed of the engine, means responsive to total pressure in the engine inlet, means responsive to total temperature in the engine inlet, means responsive to total temperature in the turbine outlet, means responsive to ambient atmospheric pressure, means responsive to engine jet nozzle area, and computing means actuated by the said responsive means providing an output of corrected thrust.

2. A thrust computer for a turbojet engine comprising, in combination, means responsive to rotational speed of the engine, means responsive to total pressure in the engine inlet, means responsive to total temperature in the engine inlet, means responsive to temperature in the turbine outlet, means responsive to ambient atmospheric pressure, means responsive to engine jet nozzle area, computing means actuated by the said responsive means providing an output indicative of corrected thrust, and indicating means responsive to the output of the computing means.

3. A thrust computer for a turbojet engine comprising, in combination, means responsive to rotational speed N of the engine, means responsive to total pressure $P_2$ in the engine inlet, means responsive to total temperature $T_2$ in the engine inlet, means responsive to total temperature $T_5$ in the turbine outlet, means responsive to ambient atmospheric pressure $P_A$, means responsive to engine jet nozzle area A, and computing means actuated by the said responsive means providing an output of corrected thrust according to the formula $$\frac{F}{\delta_2} = \left[ k_3 \frac{N}{\sqrt{\theta_2}} - k_4 \right] \left[ k_1 \sqrt{\frac{T_5}{\theta_2}} - 800 - k_2 \sqrt{\frac{T_5}{\theta_2}} \right] + A \left[ 14.7 - \frac{P_A}{\delta_2} \right]$$

where $k_1$, $k_2$, $k_3$, and $k_4$ are constants representing engine characteristics.

4. A thrust control for a turbojet engine comprising, in combination, means responsive to rotational speed N of the engine, means responsive to total pressure $P_2$ in the engine inlet, means responsive to total temperature $T_2$ in the engine inlet, means responsive to total temperature $T_5$ in the turbine outlet, means responsive to ambient atmospheric pressure $P_A$, means responsive to engine jet nozzle area A, computing means actuated by the said responsive means providing an output of corrected thrust according to the formula $$\frac{F}{\delta_2} = \left[ k_3 \frac{N}{\sqrt{\theta_2}} - k_4 \right] \left[ k_1 \sqrt{\frac{T_5}{\theta_2}} - 800 - k_2 \sqrt{\frac{T_5}{\theta_2}} \right] + A \left[ 14.7 - \frac{P_A}{\delta_2} \right]$$

where $k_1$, $k_2$, $k_3$, and $k_4$ are constants representing engine characteristics, and means actuated by the output of the computer controlling an engine operating condition determinative of engine thrust.

5. A thrust control for a turbojet engine comprising, in combination, means responsive to rotational speed N of the engine, means responsive to total pressure $P_2$ in the engine inlet, means responsive to total temperature $T_5$ in the turbine outlet, means responsive to ambient atmospheric pressure $P_A$, means responsive to engine jet nozzle area A, computing means actuated by the said responsive means providing an output of corrected thrust according to the formula $$\frac{F}{\delta_2} = \left[ k_3 \frac{N}{\sqrt{\theta_2}} - k_4 \right] \left[ k_1 \sqrt{\frac{T_5}{\theta_2}} - 800 - k_2 \sqrt{\frac{T_5}{\theta_2}} \right] + A \left[ 14.7 - \frac{P_A}{\delta_2} \right]$$

where $k_1$, $k_2$, $k_3$, and $k_4$ are constants representing engine characteristics, and means actuated by the output of the computer controlling the engine fuel supply.

References Cited in the file of this patent

UNITED STATES PATENTS

| | | |
|---|---|---|
| 2,796,136 | Mock | June 18, 1957 |
| 2,853,851 | Chandler | Sept. 30, 1958 |
| 2,857,739 | Wright | Oct. 28, 1958 |
| 2,941,399 | Bersinger | June 21, 1960 |

OTHER REFERENCES

Zucrow, M. J.: Principles of Jet Propulsion and Gas Turbines, N.Y., John Wiley & Sons, 1948, page 81.